(12) United States Patent
Taneja et al.

(10) Patent No.: US 12,718,235 B2
(45) Date of Patent: Aug. 25, 2026

(54) TRANSACTION ANALYSIS AND VISUALISATION

(71) Applicant: MASTERCARD INTERNATIONAL INCORPORATED, Purchase, NY (US)

(72) Inventors: Mohit Taneja, Waterford (IE); Jack Nicholls, Dublin (IE); James Conway, Dublin (IE); Nitish Kothale, Dublin (IE); Shannon Holland, San Francisco, CA (US); Stephen Patrick Flinter, Terenure (IE); Weston Moran, Merrimack, NH (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 51 days.

(21) Appl. No.: 18/748,018

(22) Filed: Jun. 19, 2024

(65) Prior Publication Data

US 2024/0420131 A1 Dec. 19, 2024

(30) Foreign Application Priority Data

Jun. 19, 2023 (EP) .................................... 23180153

(51) Int. Cl.
*G06Q 20/40* (2012.01)
*G06Q 20/38* (2012.01)
*H04L 9/40* (2022.01)

(52) U.S. Cl.
CPC ....... *G06Q 20/389* (2013.01); *G06Q 20/4016* (2013.01)

(58) Field of Classification Search
None
See application file for complete search history.

(56) References Cited

U.S. PATENT DOCUMENTS

2019/0236598 A1 8/2019 Padmanabhan
2019/0385170 A1 12/2019 Arrabothu et al.
(Continued)

FOREIGN PATENT DOCUMENTS

WO 2023020242 A1 2/2023

OTHER PUBLICATIONS

Galici Roberta et al: "Applying the ETL Process to Blockchain Data. Prospect and Findings", Information, vol. 11, No. 4, Apr. 10, 2020 (Apr. 10, 2020), 16 pages, XP093100367, DOI: 10.3390/info11040204.
(Continued)

*Primary Examiner* — Bennett M Sigmond
*Assistant Examiner* — Bhavin D Shah
(74) *Attorney, Agent, or Firm* — Barta Jones, PLLC

(57) ABSTRACT

A computer implemented method of decomposing a blockchain comprising transactions in digital currency for analysis and display is described. The method comprises first determining a range of blocks in the blockchain. Each block in the range of blocks in the blockchain is then unpacked into a table comprising one or more rows of input and output data for each transaction stored in the block. For the range of blocks in the blockchain, entity information and transaction information are then aggregated into a block analysis table. A node of a computing network and a computer program product adapted for implementation of such a method are also described.

20 Claims, 7 Drawing Sheets

(56) References Cited

U.S. PATENT DOCUMENTS

| | | | | |
|---|---|---|---|---|
| 2021/0295322 | A1 | 9/2021 | Xiao | |
| 2022/0067738 | A1 * | 3/2022 | Fang | G06Q 20/389 |
| 2022/0101326 | A1 * | 3/2022 | Kim | G06Q 20/4016 |
| 2023/0126708 | A1 * | 4/2023 | Wadhwa | G06N 20/20 705/44 |

OTHER PUBLICATIONS

Nofer et al., "Bus Inf Syst Eng", Blockchain, vol. 59, 2017, pp. 183-187.

Bohme et al., "Bitcoin: Economics, Technology, and Governance", Journal of Economic Perspectives, vol. 29, No. 2, 2015, pp. 213-238.

Diepstraten, Marc, "European Search Report", European Patent Application No. 23180153.1, mailed Dec. 6, 2023, 9 pages.

Lee, Kang Ha, "International Search Report & Written Opinion", International Application No. PCT/US2024/031812, mailed Sep. 27, 2024, 10 pages.

* cited by examiner

| Block Hash (key) | Tx Hash | Total value BTC | Input/ Output | Input Total | Output Total | Address Hash | value | Entity Name | Entity Type | Sanctioned address? |
|---|---|---|---|---|---|---|---|---|---|---|
| 000BC05.... | A3B0E... | 61 | Input | 61 | 61 | 18SH9v... | 50 | ... | ... | 0 |
| 000BC05.... | A3B0E... | 61 | Input | 61 | 61 | 15NUw... | 1 | ... | ... | 1 |
| 000BC05.... | A3B0E... | 61 | Input | 61 | 61 | 1ByLSV... | 10 | ... | ... | 1 |
| 000BC05.... | A3B0E... | 61 | Output | 61 | 61 | 1BBz9... | 61 | ... | ... | 0 |

FIG. 4A

| Block Hash (key) | Tx Hash | Total value BTC | Inputs | Outputs | Input Total | Average Input Value | Output Total | Average Output Value | Count Inputs Entity Criminal | Count Outputs Entity Criminal | Count Sanctioned Inputs | Count Sanctioned Outputs |
|---|---|---|---|---|---|---|---|---|---|---|---|---|
| 000BC05... | A3B0E... | 61 | 3 | 1 | 61 | 20.33 | 61 | 61 | ... | ... | 2 | 0 |

FIG. 4B

TRANSACTION ANALYSIS AND VISUALISATION

CROSS-REFERENCE TO RELATED APPLICATION

This application claims the benefit of, and priority to, European Patent Application No. 23180153.1, filed Jun. 19, 2023. The entire disclosure of the above application is incorporated herein by reference.

FIELD OF DISCLOSURE

The present disclosure relates generally to analysis of visualisation of transactions, particularly of digital currencies stored in blockchain. More specifically but not exclusively, the disclosure relates to analysis and visualisation of whether a transaction of a digital currency stored in a blockchain is fraudulent.

BACKGROUND OF DISCLOSURE

Blockchain cryptocurrencies are generally considered to be secure currencies, since their structure is designed to provide an immutable ledger of transactions, which are recorded and stored in a distributed manner across a network. However, because leading cryptocurrency blockchain protocols use pseudonymous operational systems where user identities remain hidden, these have increasingly been used for illicit purposes, such as for purchasing illicit items on darknet marketplaces.

Although the majority of blockchain cryptocurrency transactions are linked to non-fraudulent, licit activity, cryptocurrency related crime has been a major concern of governments and regulatory bodies worldwide. In particular, crypto exchanges are key points of interest in cryptocurrency networks, as these are used by criminals to lauder funds gained from illicit cryptocurrency transactions (e.g., obtained from ransomware) and obtain fiat currency (e.g. a government backed currency). Therefore, regulation has been introduced requiring cryptocurrency exchanges to perform measures such as Know Your Customer (KYC) checks on customers engaging in cryptocurrency trading and purchasing.

Currently, there are several public resources that provide information on some of the addresses associated with illicit or fraudulent cryptocurrency activity. Examples of these are: ESET, Kaspersky Lab, Malwarebytes, and Symantec. However, each block in a cryptocurrency blockchain can contain thousands of transactions. As an example, a block of the Bitcoin blockchain houses approximately 2,700 transactions, and there are over 770,000 blocks on the Bitcoin blockchain. Furthermore, each transaction (e.g. transfer of funds) can involve lots of different inputs (wallets or addressees transferring funds) and outputs (wallets or addresses receiving the transferred funds). Bitcoin transactions can contain up to 2000 inputs and outputs: analysing these for fraudulent activity is computationally expensive, and trying to gain any coherent picture of the resulting position can be very challenging.

SUMMARY OF DISCLOSURE

As described in the background above, identifying, analysing and visualising fraudulent transactions in blockchain-based cryptocurrencies such as Bitcoin is an on-going area of research interest.

Bitcoin transactions can currently be labelled as fraudulent in a heuristic manner by analysing the input and output addressees (or wallets) involved in the transaction and visualised using conventional application user interfaces. The information provided for cryptocurrencies is voluminous and complex—there can be up to 2000 inputs and outputs to any individual transaction, and each of those inputs and outputs may have over 100 features (e.g. individual columns of data) associated with it. This makes heuristic methods of labelling transactions as fraudulent difficult to achieve in real time, and any form of analysis pathway or display cumbersome. It is thus an object of embodiments herein to develop systems and methods that can be used to decompose cryptocurrency transaction information effectively for analysis and display.

Thus, according to a first aspect of the disclosure there is provided a computer implemented method of decomposing a blockchain comprising transactions in digital currency for analysis and display, the method comprising: determining a range of blocks in the blockchain; unpacking each block in the range of blocks in the blockchain into a table comprising one or more rows of input and output data for each transaction stored in the block; for the range of blocks in the blockchain, aggregating entity information and aggregating transaction information into a block analysis table.

As noted above, blockchain technologies have gained widespread recognition for their ability to securely record and store transaction data in a decentralised manner. However, understanding and interpreting raw blockchain data can be challenging due to its complex structure and sheer volume. There exists a need for an efficient, user-friendly solution that can visualise this data and provide statistical insights to help users make informed decisions. This approach to decomposing blockchain transactions and aggregation of data by entity enables effective analysis and visualization.

Using this approach, particularly when carried out in connection with real-time labelling of transactions for fraudulent activity, the complexity of cryptocurrency transactions can be resolved and analysis and visualization of transactions can be carried out directly.

In embodiments, after unpacking each block, the method comprises merging the tables for each block into a merged data frame. Aggregating entity information and aggregating transaction information into the block analysis table may then comprise extracting aggregated entity information and aggregated transaction information for the aggregated entity information from the merged data frame using one or more scripts or functions.

In embodiments, the transaction data is stored in a tree-like structure and the step of unpacking each block in the range of blocks may comprise for each block in the range of blocks: unpacking the block into a table comprising one or more rows of input and output data for each transaction stored in the block; and aggregating the one or more rows of input and output data to form an aggregated row of transaction data for each transaction. In such a case, the step of unpacking the block may then comprise: unpacking the block into a plurality of stages; and performing outer joins between the plurality of stages to obtain a table comprising the one or more rows of input and output data for each transaction. The step of performing outer joins may then comprise: using the SCHEMA.DATASET.btc_block_stg table as the primary table; and performing outer joins to the stages in the plurality of stages to extract unnested information from the block into the table. In such cases, the block may be stored in the NoSQL format. With transaction data stored in such a structure, the step of aggregating the one or more rows of input and output data may comprise combining the one or more rows into a single row, by taking a statistical aggregation of values of each field in the respective rows of input and output data.

In embodiments, the method may further comprise a step of labelling some or each of the transactions as fraudulent, wherein the step of labelling is based in part on whether an addressee listed in the transaction data is known to be involved in fraudulent activity.

In embodiments, the digital currency may be based on the Unspent Transaction Output, UTxO design. In embodiments, the method may further comprise analysing digital currency activity using the block analysis table. In embodiments, the method may further comprise displaying digital currency activity using the block analysis table.

According to a second aspect of the disclosure there is provided a node in a computing network for decomposing a blockchain comprising transactions in digital currency for analysis and display, wherein the node is configured to: determine a range of blocks in the blockchain; unpacking each block in the range of blocks in the blockchain into a table comprising one or more rows of input and output data for each transaction stored in the block; and for the range of blocks in the blockchain, aggregate entity information and aggregate transaction information into a block analysis table. Such a node may be further configured to perform the method of any version of the first aspect.

According to a third aspect of the disclosure, there is provided a computer program product comprising a computer readable medium, the computer readable medium having computer readable code embodied therein, the computer readable code being configured such that, on execution by a suitable computer or processor, the computer or processor is caused to perform the method as provided by the first aspect of the disclosure.

BRIEF DESCRIPTION OF THE DRAWINGS

FIG. 4A shows example input and output rows of transaction data for an example transaction.

FIG. 4B shows example aggregated transaction data for the example input and output rows of transaction data shown in FIG. 4A.

DETAILED DESCRIPTION OF EMBODIMENTS

As described above in the summary section, the disclosure herein relates to providing a basis for analysis and display of transactions in a digital currency (e.g. a cryptocurrency), preferably in connection with a determination of whether individual transactions are fraudulent, but more generally to allow assessment of the whole transaction system for the digital currency. Given the complexity of digital currency transactions generally, providing information suitable for analysis and display is challenging.

Figure 1:
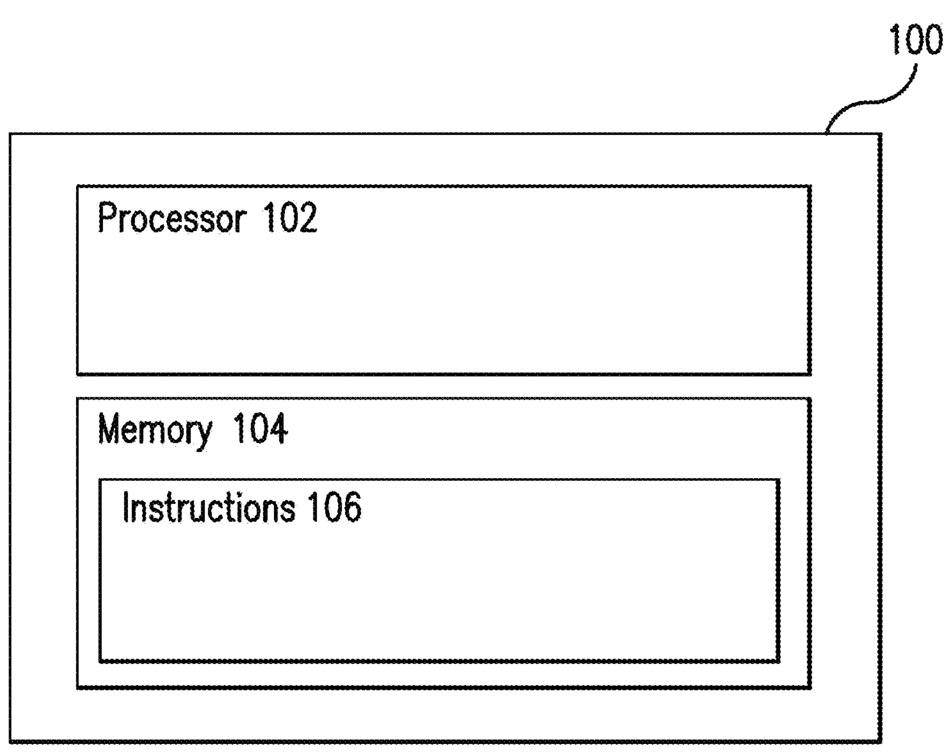
FIG. 1 illustrates an example computing node suitable for implementing embodiments of the present disclosure.

FIG. 1 shows a node (e.g. a computing node) according to some embodiments herein. The node 100 may generally be configured (e.g. operative) to perform any of the methods and functions described herein, such as the method 200 and the method 700 described in detail below.

In some embodiments, the node 100 comprises a processor 102, a memory 104 and set of instructions 106. The memory holds instruction data (e.g. such as compiled code) representing set of instructions 106. The processor may be configured to communicate with the memory and to execute the set of instructions. The set of instructions, when executed by the processor, may cause the processor to perform any of the methods herein, such as the method 200 described below.

Processor (e.g. processing circuitry or logic) 102 may be any type of processor, such as, for example, a central processing unit (CPU), a Graphics Processing Unit (GPU), a Neural Processing Unit (NPU), or any other type of processing unit. Processor 102 may comprise one or more sub-processors, processing units, multi-core processors or modules that are configured to work together in a distributed manner to control the node in the manner described herein.

The node 100 may comprise a memory 104. In some embodiments, the memory 104 of the node 100 can be configured to store program code or instructions that can be executed by the processor 102 of the node 100 to perform the functionality described herein. The memory 104 of the node 100, may be configured to store any data or information referred to herein, such as for example, requests, resources, information, data, signals, or similar that are described herein. The processor 102 of the node 100 may be configured to control the memory 104 of the node 100 to store such information.

In some embodiments, the node 100 may be a virtual node, e.g. such as a virtual machine or any other containerised computer node. In such embodiments, the processor 102 and the memory 104 may be portions of larger processing and memory resources respectively.

It will be appreciated that a computing node 100 may comprise other components to those illustrated in FIG. 1. For example, node 100 may comprise a power supply (e.g. mains or battery power supply). The node 100 may further comprise a wireless transmitter and/or wireless receiver to communicate wirelessly with other computing nodes. In some embodiments, the node 100 may further comprise a user input device such as a mouse, keyboard, or touch pad, for receiving input user data. In some embodiments, the node 100 may further comprise a display for displaying any of the data described herein, such as for example, any of the outputs (or intermediate data products) of any of the methods described herein.

As described above, the node 100 is for use in analysis and display of transactions of a digital currency stored in a blockchain. Thus, in some embodiments, the node 100 may be in a peer-to-peer network involved in storing a blockchain. In other embodiments, as will be described in more detail below, the node 100 may be comprised in (or otherwise associated with) a currency exchange, to allow analysis and display of information relating to transactions in the digital currency.

As noted above, in some embodiments, the node 100 is configured to determine a range of blocks in the blockchain. It is then configured to unpack each block in the range of blocks in the blockchain into a table comprising one or more rows of input and output data for each transaction stored in the block. For the range of blocks in the blockchain, the node 100 is then configured to aggregate entity information and aggregating transaction information into a block analysis table.

The skilled person will be familiar with blockchain, but in brief, a blockchain is a distributed database that maintains a continuously growing list of ordered records, e.g., blocks. Each block contains a cryptographic hash of the previous block, a timestamp and transaction data for the transactions captured in the block. In this way, a chain is created. The blockchain is stored in a decentralized, distributed and public digital ledger that is used to record transactions across a peer-to-peer network. Each server in the distributed system stores a copy of the ledger and communicates with other servers in the distributed system to build a consensus of the transactions that have occurred. The record of the transactions cannot be altered retroactively without the alteration of all subsequent blocks and the consensus of the other servers in the peer-to-peer network. As such, over time, the blocks in a blockchain became fixed and unchanging (immutable). For more information, see the paper by Nofer, M., Gomber, P., Hinz, O. et al. entitled "Blockchain" Bus Inf Syst Eng 59, 183-187 (2017).

Embodiments herein relate to digital currencies stored in blockchain, which may otherwise be referred to herein as cryptocurrencies. The skilled person will be familiar with cryptocurrencies, which may be different to e.g. fiat currencies which are generally backed by government bodies and which may be transferred either digitally or using physical currency. Generally, the digital currency described herein may be a cryptocurrency based on the Unspent Transaction Output, UTxO design. Examples of these cryptocurrencies include, but are not limited to: Bitcoin, Bitcoin cash and Litecoin. The skilled person will be familiar with bitcoin, which is discussed, for example, in the paper by Böhme, Rainer, Nicolas Christin, Benjamin Edelman, and Tyler Moore. 2015, entitled: "Bitcoin: Economics, Technology, and Governance." Journal of Economic Perspectives, 29 (2): 213-38.

The disclosure herein relates to transactions. A transaction in this sense is a transfer of funds (e.g. items of currency) on the blockchain from a first entity to a second entity. In this sense an entity may be an owner of the funds on the blockchain. An entity may otherwise be referred to herein as an addressee. Digital currency may be held in a wallet belonging to an entity or addressee. As such, a transaction may be described as a transfer of funds from a first wallet to a second wallet.

Cryptocurrency transactions may be described as illicit or fraudulent for many reasons. For example, a transaction may be fraudulent if it involves entities that have been involved in illegal activities, or involves a transfer of funds for an illegal reason, for example, including but not limited to money laundering; fraud; embezzlement; extortion; darknet market; and/or funds obtained through ransomware. In addition, transactions may be considered fraudulent or illicit if they include digital coins that originated from illegal transactions (such as the types listed above), even when the entities or wallets involved in the transaction are not directly linked to the illegal activities. It will be appreciated that these are merely examples and that a transaction may be labelled fraudulent for other reasons to those listed above.

While the present disclosure is directed to analysis and visualisation of transactions, it is particularly effectively used together with a method of predicting whether transactions are fraudulent. This is not described in detail here—the approaches set out here may be used with any method of predicting or determining that transactions are fraudulent—but the approach to analysis and visualisation of transactions described here may readily be used in the applicant's patent application Ser. No. 18/747,982, filed on Jun. 19, 2024 and entitled "Predicting Fraudulent Transactions" and patent application Ser. No. 18/747,992, also filed on Jun. 19, 2024 and entitled "Predicting Whether a Transaction of a Digital Currency Stored in a Blockchain is Fraudulent", which are both incorporated by reference herein. In this context and in these co-pending applications, "predicting" may involve estimating, by means of a model trained using a machine learning process, whether a transaction involves wallets or users that were involved in illicit activities, or if a transaction includes cryptocurrency originated from illicit activities. The prediction may be in the form of a label, such as for example, a binary label.

Figure 2:
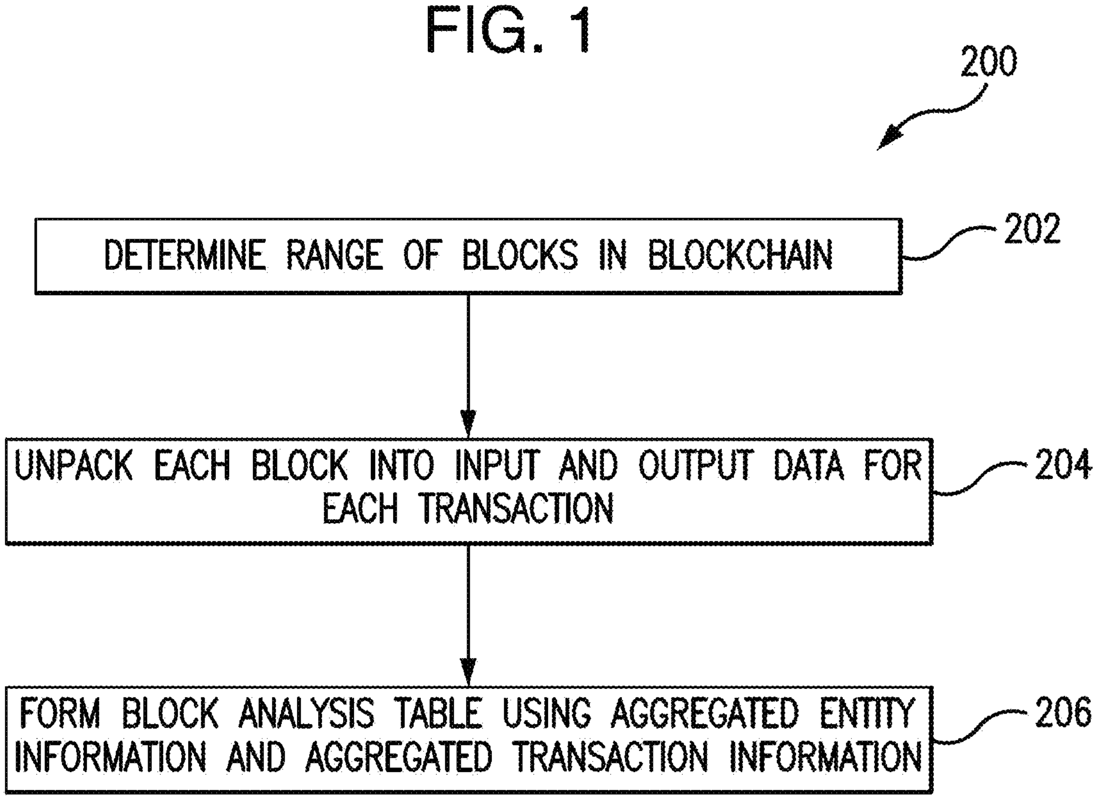
FIG. 2 shows an exemplary method of decomposing a blockchain comprising transactions in digital currency according to embodiments of the present disclosure.

FIG. 2 shows a method of decomposing a blockchain comprising transactions in digital currency for analysis and display. The method 200 is computer implemented and may be performed by a computing node such as the node 100 described above.

In embodiments of the disclosure, the following steps are taken in the method. In a first step, the method comprises determining a range of blocks in the blockchain. After this, the method comprises unpacking each block in the range of blocks in the blockchain into a table comprising one or more rows of input and output data for each transaction stored in the block. Subsequently, for the range of blocks in the blockchain, the method comprises aggregating entity information and aggregating transaction information into (206) a block analysis table.

Such a blockchain may be stored in the cloud. For example, in embodiments where the digital currency is bitcoin, Google Cloud may be used to store the blockchain data. Google Cloud data may be accessed using a query tool such as the "BigQuery" tool. Resources such as Jupyter Notebook may be used to query a range of blocks. Historical transaction data may be held in blocks of the blockchain stored, for example, in the cloud. Thus, in step 202, the method 200 may comprise obtaining blocks in the blockchain within a specified range, e.g. from a cloud storage such as Google Cloud.

The data in the received block may be arranged in a tree-like structure (such as a Merkle Tree). In some embodiments, the block is stored in a NoSQL storage. Step 202 may therefore comprise unpacking said tree-like structure to present each transaction as a plurality of input and output rows of transaction data.

In Bitcoin, each block in the Bitcoin blockchain houses approximately 2,700 transactions and each transaction can have up to 2000 inputs and outputs. The inputs and outputs of a transaction contain information indicating which entities (e.g. which addresses or wallets) are transferring funds to which other addresses (e.g. which other addresses or wallets) in a transaction. Input transaction data is data related to an entity that is making a transfer of funds in a transaction. Output transaction data is data related to an entity that is receiving said funds in the transaction (e.g. the beneficiary/recipient of the transaction). There may be more than one input to a transaction because more than one wallet may contribute funds to a single transaction. There may also be more than one output to a transaction, because funds that are transferred may be split between two or more recipients of the transaction.

In embodiments described here, step 202 comprises unpacking blocks in the blockchain into a table comprising one or more rows of input and output data for the first transaction stored in the block.

The unpacking, or unnesting of the data from the database (e.g., BigQuery, cloud storage) may be performed using rules or schemas to split the data packet in the database. The transaction data in the block may be stored in a tree-like structure such as a Merkle tree. As another example, the block may be stored in one or more Avro™ block files in the Apache Avro™ format which is described in the paper by Hukill, G. S., & Hudson, C. (2018) entitled: "Avro: Overview and Implications for Metadata Processing".

In such embodiments, the step of unpacking may comprise unpacking the block into a plurality of stages and performing outer joins between the plurality of stages to obtain a table comprising the one or more rows of input and output data for the first transaction.

In one embodiment, where the digital currency is bitcoin, the step of unpacking the block in the block chain is performed by creating multiple schemas to house the various sub-levels of the Bitcoin dataset. This unpacking or unnesting is the result of unwinding the Avro™ block files into a standard table. In this process, the following steps are performed:

Unpack the NoSQL format data into staging table.

Unpack each level into individual stages.

The Primary table is the SCHEMA.DATASET.btc_ block_ stg and this performs outer joins with the remaining stages to extract the unnested information into a single table.

Figure 3:
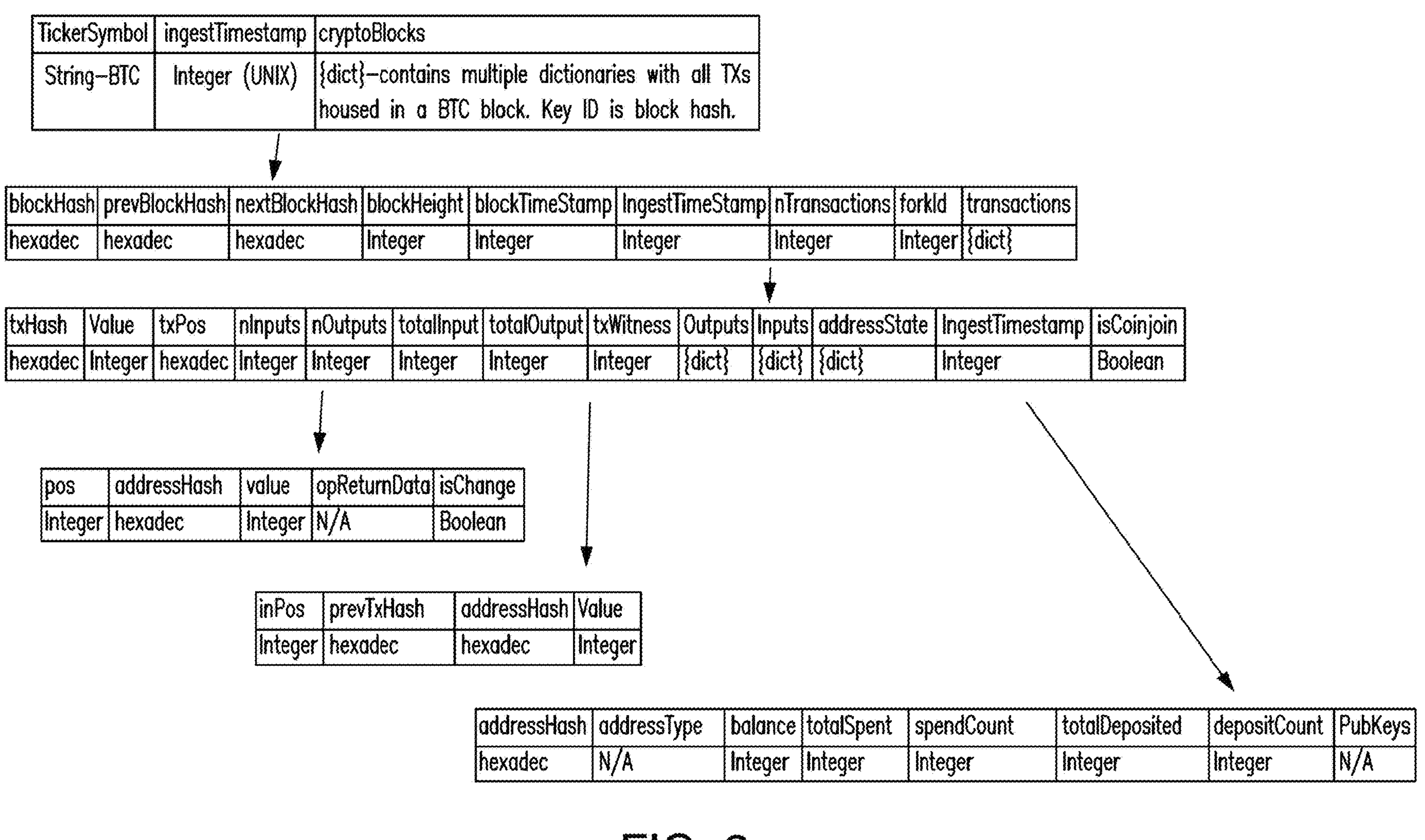
FIG. 3 shows an exemplary manner of unpacking transaction data stored in a block of a blockchain according to some embodiments herein.

The unpacking process is illustrated in FIG. 3. To summarise, the cryptobloc houses the core information and the purpose of step 202 in the bitcoin embodiment is to unpack the avro files to the transactional data level. This unpacking process results in a table that includes a row for each element of the array in the non-SQL data contained in the database. The table obtained from the unpacking of the non-SQL data includes an indication, or identification of whether a row corresponds to an input or an output in the transaction. Appendix I shows an illustrative example of the table obtained from the unpacking of the DataFrame in an embodiment where the digital currency stored in the blockchain is Bitcoin.

The unpacked cryptocurrency blocks may result in thousands of rows, due to each transaction in the blockchain comprising multiple inputs and outputs. The volume of data associated with a transaction can make it computationally too expensive for many heuristic methods to process a transaction in real-time as part of a verification process.

Thus, in embodiments herein, in step 202 the one or more rows of input and output data may be aggregated to form an aggregated row of transaction data for each transaction. The transaction data unpacked from the DataFrame can be aggregated or compressed in a manner that reduces the number of features in the data to a size that is more manageable, thus enabling efficient processing and analysis of the data. Both the transaction data related to the first transaction and the transaction data related to the second transaction that preceded the first transaction may be aggregated.

Thus, after the data is unpacked (e.g. from a non-SQL database), the one or more rows of input and output transaction data may be aggregated to form an aggregated row of transaction data for a transaction. Compression of the data in this manner enables analysis and decision making based on the data, while also allowing different levels of granularity to be customised based on the specific requirements of the data and also while preventing any loss in information contained in the unnested data.

The one or more rows of input and output data may be aggregated into a single row of data. In other embodiments, the one or more rows of input and output data may be aggregated into two rows of data, a first row comprising an aggregation of the inputs to the transaction and a second row comprising an aggregation of the outputs of the transaction. It will be appreciated that these are merely examples, and that the one or more rows of input and output data may equally be aggregated to produce more than two rows of aggregated data.

The aggregation (or compression) may be performed in different ways. For example, in some embodiments, a statistical aggregation of each field (or feature) in the one or more rows is taken. In this sense, a statistical aggregation may be any one or any combination of, a count, average, median, mean, mode, standard deviation, or range of the values in the one or more inputs and outputs of the transaction. It will be appreciated that these are merely examples however and that other functions may equally be applied to combine the values in a field.

It will also be appreciated that different types of statistical aggregation may be performed on different fields. For example, the values of a first field may be aggregated using a first function (e.g. selected from a count, average, median, mean, mode, standard deviation, or range) and a second field may be aggregated using a second function (e.g. selected from a count, average, median, mean, mode, standard deviation, or range). The aggregation condenses the information within a transaction, reducing computational costs of processing the data, without incurring significant loss of information.

Appendix II shows an example of the different functions that may be used to aggregate different fields of input and output data in an embodiment where the digital currency stored in the blockchain is bitcoin.

In the example in Appendix II, creation of the Aggregated Transaction Table follows a similar process to that of the creation of the granular transaction table formed by the unpacking of the data. The aggregated table has functions applied to the underlying data on the same stages to extract the information and create a single line transaction table. The short formula column shows the type of formula applied. The process may be summarized in the following steps:

Unpack the NoSQL format data into staging table.

Unpack each level into individual stages.

The Primary table is the SCHEMA.DATASET.btc_ block_ stg and this performs outer joins with the remaining stages to extract the unnested information into a single table.

The joins are performed through functions to assemble the aggregated transaction table.

This table includes a label field (illicit flag) which in this example, is manually assigned to the transaction based on the underlying entities assigned to the address labels (e.g. obtained using a heuristic method such as cipher trace), using the rule: if any of the following flags=1, then the illicit label is set=1→dark market, mixer, gambling, high risk exchange, criminal, ransomware, sanctioned. This is explained in more detail below with respect to step 206.

In this embodiment, example inputs to step 204 are shown in FIG. 4*a* and an example output aggregated transaction data is shown in FIG. 4*b*.

There are approx. 100 features in total per transaction.

In embodiments, the method may further comprise labelling the transaction data (or the aggregated row of transaction data if an aggregation is performed as described above) for a transaction according to whether the transaction was fraudulent. The labelling may be performed in any known manner. For example, a heuristic method may be used to label the data as fraudulent or not fraudulent.

In one embodiment, a binary flag is used (e.g. "0" being non-fraudulent and "1" being fraudulent, or vice-versa) as a label to denote whether the transaction is fraudulent or not.

A binary flag may be set based on whether any of the underlying entities assigned to the address labels are known to be associated with fraudulent activity. In one example, a binary flag is set so as to indicate a transaction is fraudulent if any of the addresses in the one or more input and output rows of transaction data for a related transaction are associated with the dark market, a high risk exchange, criminal activity, ransomware or sanctioned entities.

In one example, a tool such as CipherTrace™ is used to label a transaction. For example, the flags output by CipherTrace™ may be combined into a single binary flag. It will be appreciated that CipherTrace™ is merely an example however and that any other tool for heuristically labelling a transaction as fraudulent or non-fraudulent might equally be used.

It will further be appreciated that these are merely examples, and that other methods of labelling a transaction may equally be used. For example, the label may be in the form of a probability or other score.

Figure 5:
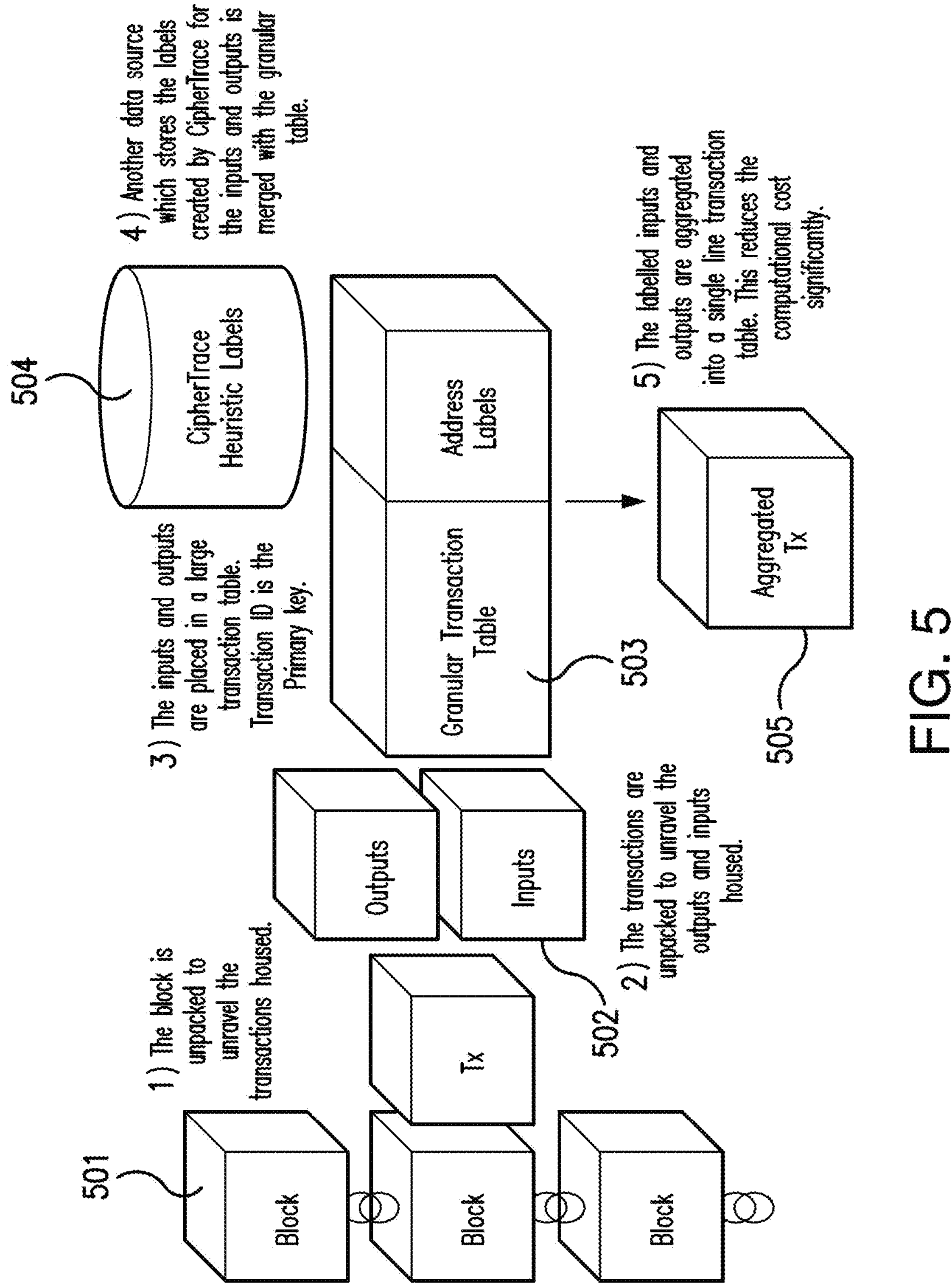
FIG. 5 is a schematic diagram showing example steps of a method for obtaining an aggregated transaction table for use in embodiments of the present disclosure.

FIG. 5 shows an example method according to some embodiments herein. In step 501 a block in the blockchain is obtained (e.g. from the cloud, as described above) is unpacked to unravel the transactions housed therein. In step 502, the transactions are unpacked to unravel the outputs and inputs housed. In step 503 the inputs and outputs are placed in a large transaction table, using Transaction ID as the Primary Key. Transaction Data for Neighbouring Transactions is also added using the previous transaction hash identifier providing the connections. In step 504, the data is combined with another data source such as CipherTrace™ as described above, to label the input and output rows of transaction data as fraudulent or non-fraudulent. In step 505, in this embodiment, the labelled inputs and outputs are aggregated into a single line of aggregated transaction data. This aggregation can significantly reduce the computational cost.

Figure 6:
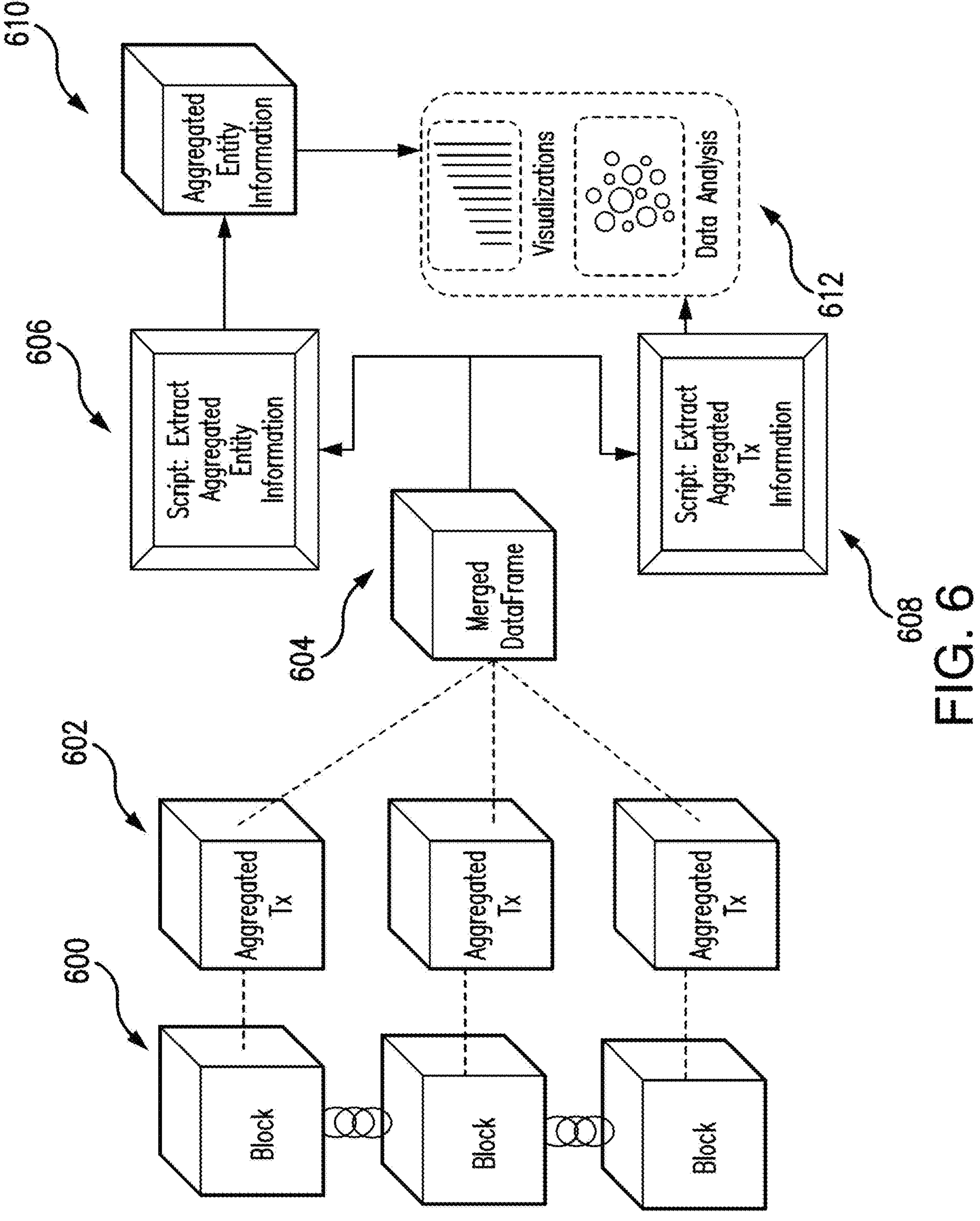
FIG. 6 is a schematic diagram showing decomposition of blocks to provide aggregated transactions and subsequently aggregated entity and transaction information according to embodiments of the present disclosure.

FIG. 6 illustrates how the unpacking method of FIG. 5 fits into an embodiment of the disclosure. As previously discussed, a range of blocks 600 can be queried using Google Cloud API with well-known resources such as Jupyter Notebook. The blocks are then downloaded and prepared as shown in FIG. 5 in the aggregated transaction format 602, which includes transactional information and entity information necessary for analysis and visualization. The amount of data is now tractable in one resource, and the blocks in aggregated transaction format 602 can be compiled into a merged data frame 604. Data for use in analysis and visualization can be extracted from this merged data frame 604: a first script 606 (or function, set of scripts, or set of scripts and functions) extracts aggregated entity information 610 from the merged data frame 604; and a second script 608 (or function, set of scripts, or set of scripts and functions) extracts aggregated transaction information for use with the aggregated entity information 610. All this information can now be aggregated into a new block analysis table 612 for visualization and data analysis.

Figure 7:
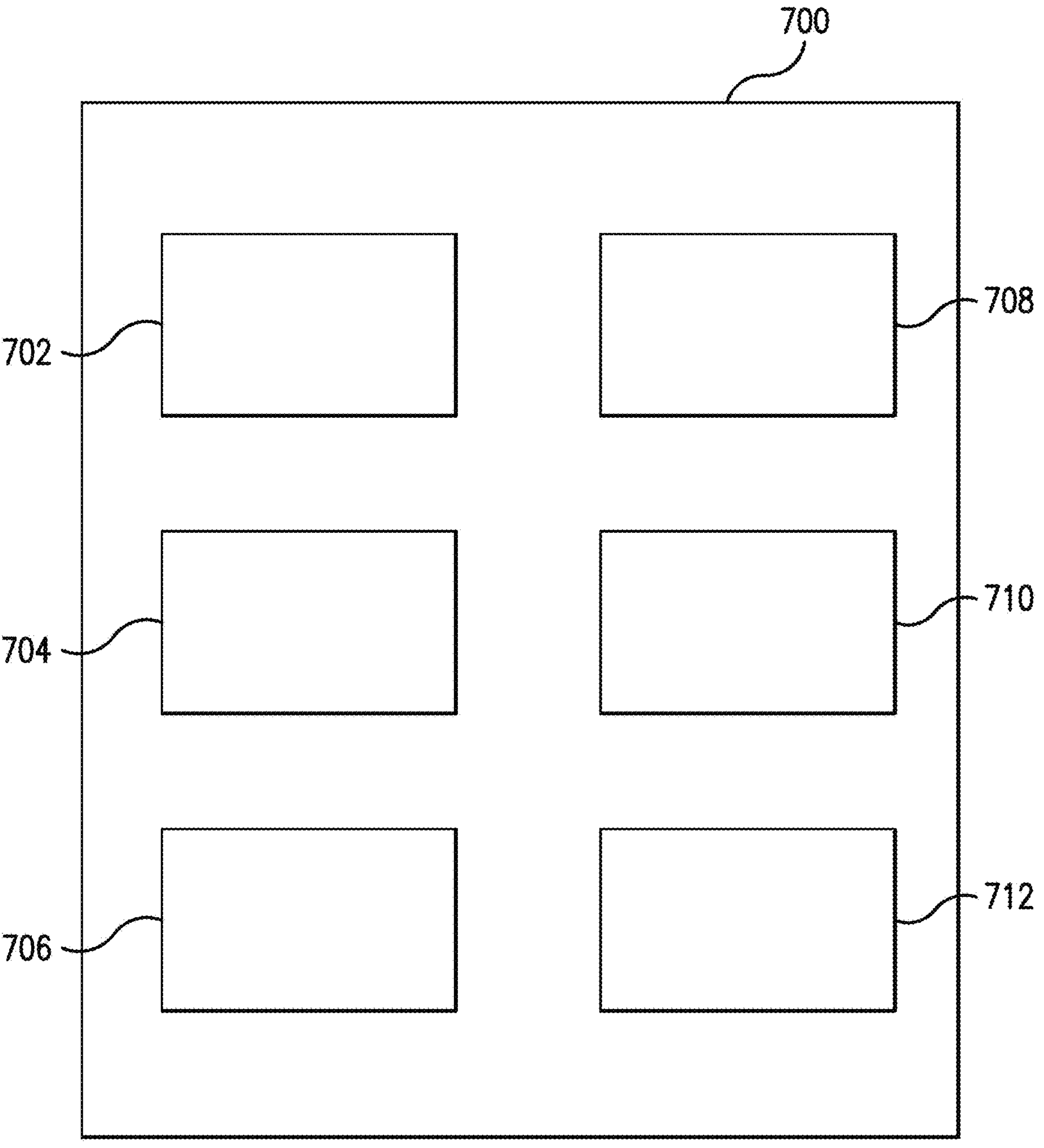
FIG. 7 is a schematic diagram showing elements of software adapted to perform steps as illustrated in FIG. 6 according to embodiments of the present disclosure.

FIG. 7 illustrates elements of a software solution—which may be implemented, for example, as a Python-based script using standard data science libraries familiar to the person skilled in the art—for performing this extraction and aggregation process for visualization. This software solution 700 is adapted to provide both a visualisation of transactions stored in a blockchain and statistical information to go with this visual output. Such a solution can be implemented as a standalone software application, a web application, or as a plugin for blockchain wallets or other related software.

The software solution extracts transaction data from the blockchain, processes this data, and creates visual representations. Additionally, it computes statistical parameters such as mean, median, and standard deviation, provided in visual format for easier understanding. Such a solution simplifies the process of analysing and understanding blockchain transactions. It presents data in an easily interpretable manner, reducing the complexity associated with raw blockchain data. The software solution provides a scalable system that can handle large amounts of data efficiently. It also allows for customisation based on user preferences. An exemplary implementation of such a software solution 700 here comprises the following modules.

Data extraction module 702 connects to the relevant blockchain via relevant APIs or local blockchain node installations and extracts transaction data. It filters and structures this data for further processing. The extracted data may include, but is not limited to, transaction IDs, timestamps, involved addresses, amounts transferred, and block IDs.

Data processing module 704 processes the extracted data, preparing it for visualization and statistical analysis. It may be implemented using data structures like pandas. DataFrame for efficient data handling and manipulation. It organizes the data in a way that highlights the key features needed for analysis and visualization.

Visualization module 706 may use libraries such as Matplotlib and Seaborn to visualize the processed data. It can create various types of charts and graphs, such as bar graphs, line graphs, pie charts, and heat maps. The user can choose the type of visualization based on their preference. It also supports interactive visualization using libraries like Plotly, allowing users to zoom, pan, and hover over data points for more details.

Statistical analysis module 708 performs statistical computations on the data. It calculates the mean, median, and standard deviation of various parameters such as transaction amounts, block sizes, total transaction volume, total transaction amount, aggregated sum, confirmation times and so on. It may also provide a histogram view of the frequency distribution of the parameters. In implementations, libraries such as numpy and scipy may be used for these calculations.

User interface module 710 provides an intuitive interface for users to interact with the system. It may offer features including options to select the type of visualization, the statistical parameters to calculate, the time range for the analysis, and more.

Export module 712 allows users to export the visualized data and statistical results in various formats like PNG, JPEG, CSV, or JSON for further use.

Using this approach, it becomes easy to analyse and visualize transactions across large ranges of the blockchain—this is not practically achievable from the raw data given its quantity and complexity. It consequently becomes possible analyze the transactions in a block range to understand the underlying data (such as labels, transaction amounts, and mining amounts). Such analysis outcomes can include identification of bugs if there are outliers in classified entities. Moreover, model performance—for example, in the labelling of transactions as fraudulent—can be evaluated across a broad range of transactions, and (here) an illicit transaction detection model can be compared against existing analytics, and areas (for example, for specific entity types) it can be determined if its performance is particularly good or bad.

The following outcomes can be achieved using this approach to providing analytics and visualization of transactions across a blockchain:

- Customers can be made aware of the current illicit landscape in a given month, and provided with aggregated information on current transactions in the network (average transaction values, current transactions made in a 24 hour period, etc.)
- Existing cryptocurrency analysis products (products such as CipherTrace Inspector) can use such an approach to build out landing page analytics for data that has been warehoused for assessment.
- Current data output can be evaluated to classify entities, or to verify entity classification. Any errors in an existing pipeline will be recognised if a large entity is misclassed as this will lead to a spike in a given entity.
- Trends in criminal activity can be identified (as discussed further below).
- The quality of Bitcoin transaction monitoring can be back-tested. The results can be extracted from the model and compared against actual entities to identify trends in the underlying model performance (i.e., is the model better at identifying darknet marketplace transactions, gambling transaction, mixing, etc.)

Figure 8:
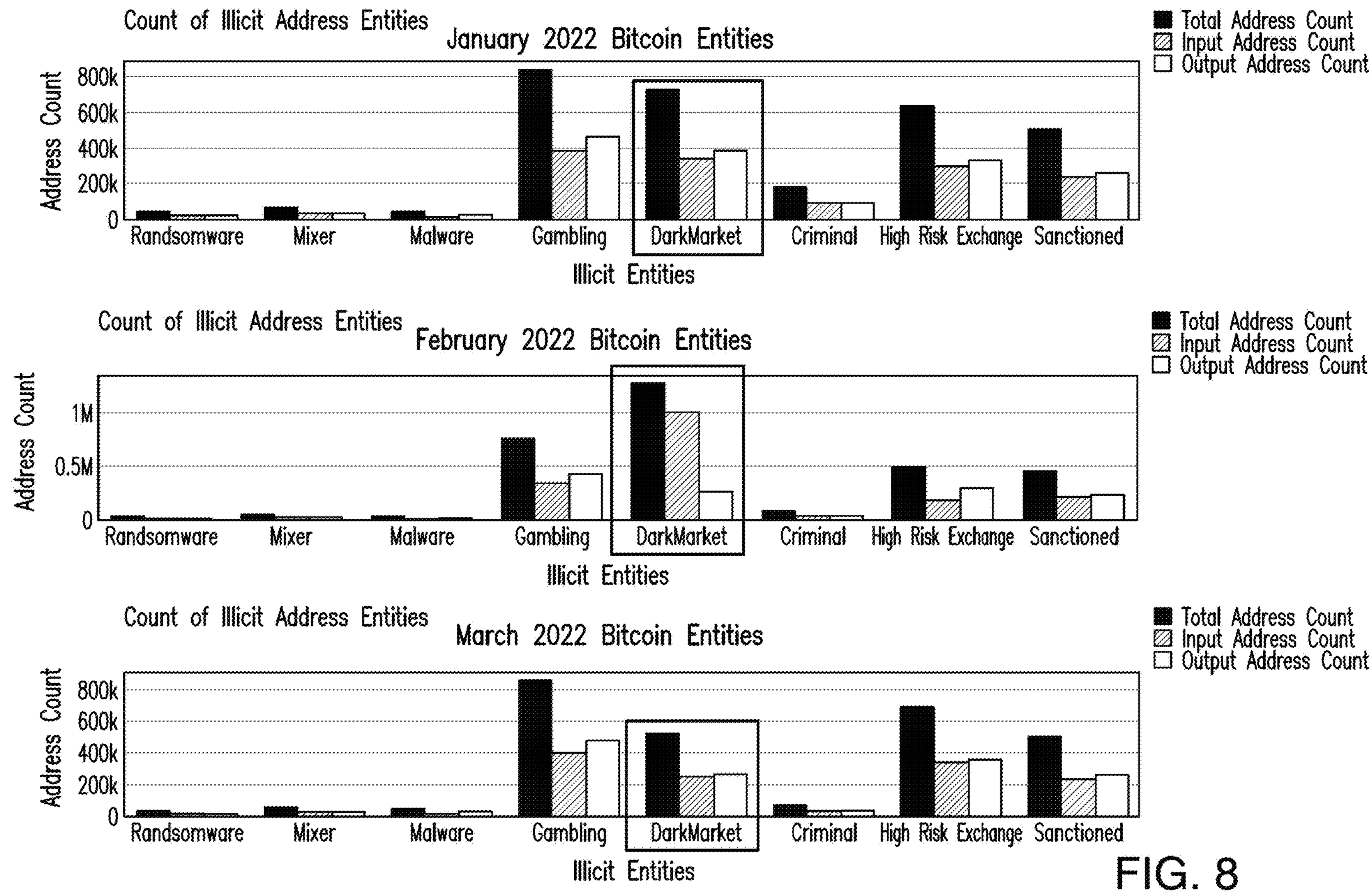
FIG. 8 provides exemplary output from the block decomposition process of FIG. 6.

An exemplary use of this analysis and visualization is shown in FIG. 8. This illustrates both awareness of current illicit landscape and also identification o trends in criminal activity. Here, the bar chart of Bitcoin entities shows a spike for DarkMarket in February 2022—there is a higher level of addresses resulting from a significant increase in the input address count over this period. This was determined to be a result of large movements of Bitcoin out of darknet marketplaces which were shut down by law enforcement over this period. The spike can as a result be inferred to be the result of illicit activity, with criminals withdrawing significant funds from DarkMarket.

Turning now to another embodiment, there is also provided a computer program product comprising a computer readable medium, the computer readable medium having computer readable code embodied therein, the computer readable code being configured such that, on execution by a suitable computer or processor, the computer or processor is caused to perform the method or methods described herein, such as the method 200 and/or the method 700.

Thus, it will be appreciated that the disclosure also applies to computer programs, particularly computer programs on or in a carrier, adapted to put embodiments into practice. A program may be in the form of a source code, an object code, a code intermediate source and an object code such as in a partially compiled form, or in any other form suitable for use in the implementation of the method according to the embodiments described herein.

It will also be appreciated that such a program may have many different architectural designs. For example, a program code implementing the functionality of the method or system may be sub-divided into one or more sub-routines. Many different ways of distributing the functionality among these sub-routines will be apparent to the skilled person.

The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at runtime. The main program contains at least one call to at least one of the sub-routines. The subroutines may also comprise function calls to each other.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

Variations to the disclosed embodiments can be understood and effected by those skilled in the art in practicing the claimed disclosure, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. Alternatively, more than one processor or other unit may jointly perform aspects of a single function recited in the claims.

Within the scope of this application, it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner. Any reference signs in the claims should not be construed as limiting the scope.

APPENDIX I

| | |
|---|---|
| SCHEMA.DATASET.btc_block_stg | tickerSymbol<br>btcBlock_ingestTimestamp<br>blockHash<br>prevBlockHash<br>nextBlockHash<br>blockHeight<br>blockTimestamp<br>cryptoBlock_ingestTimestamp<br>nTransactions<br>forkId<br>txHash<br>txValue<br>txPos<br>nInputs |

APPENDIX I-continued

| | |
|---|---|
| | nOutputs |
| | totalInput |
| | totalOutput |
| | txWitness |
| | tx_ingestTimestamp |
| | isCoinjoin |
| SCHEMA.DATASET.btc_block_txOutputs_stg | txOutputs_pos |
| | txOutputs_addressHash |
| | txOutputs_value |
| | txOutputs_opReturnData |
| | txOutputs_isChange |
| Manual Condition | Is_Output(0, 1) |
| SCHEMA.DATASET.btc_block_txInputs_stg | txInputs_pos |
| | txInputs_addressHash |
| | txInputs_value |
| | txInputs_opReturnData |
| | txInputs_isChange |
| Manual Condition | Is_Input(0, 1) |
| SCHEMA.DATASET.btc_block_addressState_stg | txAddressState_addressHash |
| | txAddressState_addressType |
| | txAddressState_balance |
| | txAddressState_totalSpent |
| | txAddressState_spendCount |
| | txAddressState_totalDeposited |
| | txAddressState_depositCount |
| | txAddressState_pubKeys |

APPENDIX II

| Source | | Short Formula | Long Formula |
|---|---|---|---|
| SCHEMA.DATASET.btc_block_stg | tickerSymbol | | |
| | btcBlock_ingestTimestamp | | |
| | blockHash | | |
| | prevBlockHash | | |
| | nextBlockHash | | |
| | blockHeight | | |
| | blockTimestamp | | |
| | cryptoBlock_ingestTimestamp | | |
| | nTransactions | | |
| | forkId | | |
| | txHash | | |
| | txValue | | |
| | txPos | | |
| | nInputs | | |
| | nOutputs | | |
| | totalInput | | |
| | totalOutput | | |
| | txWitness | | |
| | tx_ingestTimestamp | | |
| | isCoinjoin | | |
| SCHEMA.DATASET.btc_block_stg | count - unique input addresses in txHash | count | btc_block_stg(nInputs)-unique(btc_block_stg(nInputs)) |
| SCHEMA.DATASET.btc_block_stg | count - unique output addresses in txHash | count | btc_block_stg(nOutputs)-unique(btc_block_stg(nOutputs)) |
| Manual | count - number of input and output with same address hash | count | Compare list of unique inputs vs unique outputs -> if any are equal, count |
| SCHEMA.DATASET.btc_block_txInputs_stg | count - recurring input addresses in input txHash | count | |
| SCHEMA.DATASET.btc_block_txOutputs_stg | count - recurring output addresses in output txHash | count | |
| SCHEMA.DATASET.btc_block_txInputs_stg | average - input value in txHash | average | btc_block_stg(total Input)/btc_block_stg(nInputs) |
| SCHEMA.DATASET.btc_block_txOutputs_stg | average - output value in txHash | average | btc_block_stg(total Output)/btc_block stg(nOutputs) |
| SCHEMA.DATASET.btc_block_txInputs_stg | standard deviation - input value in txHash | st. dev | |
| SCHEMA.DATASET.btc_block_txOutputs_stg | standard deviation - output value in txHash | st. dev | |
| SCHEMA.DATASET.btc_block_txInputs_stg | median - input value in txHash | median | |
| SCHEMA.DATASET.btc_block_txOutputs_stg | median - output value in txHash | median | |
| SCHEMA.DATASET.btc_block_txInputs_stg | minimum - input value in txHash | min | |
| SCHEMA.DATASET.btc_block_txOutputs_stg | minimum - output value in txHash | min | |
| SCHEMA.DATASET.btc_block_txInputs_stg | maximum - input value in txHash | max | |
| SCHEMA.DATASET.btc_block_txOutputs_stg | maximum - output value in txHash | max | |

APPENDIX II-continued

| Source | | Short Formula | Long Formula |
|---|---|---|---|
| SCHEMA.DATASET.btc_block_ txInputs_stg | count - number of recurring input value in txHash | count | |
| SCHEMA.DATASET.btc_block_ txOutputs_stg | count - number of recurring output value in txHash | count | |
| SCHEMA.DATASET.btc_block_ txInputs_stg | array - all input addresses in txHash | list | |
| SCHEMA.DATASET.btc_block_ txOutputs_stg | array - all output addresses in txHash | list | |
| SCHEMA.DATASET.btc_block_ txInputs_stg | count - 2 decimal place round input value | count | if input value rounded to decimal places with recurring zeroes, count +1 |
| SCHEMA.DATASET.btc_block_ txOutputs_stg | count - 2 decimal place round output value | count | if output value rounded to decimal places with recurring zeroes, count +1 |
| SCHEMA.DATASET.btc_block_ addressState_stg | average - address balance in txHash | average | |
| SCHEMA.DATASET.btc_block_ addressState_stg | average - address total spend in txHash | average | |
| SCHEMA.DATASET.btc_block_ addressState_stg | average - address total spend count in txHash | average | |
| SCHEMA.DATASET.btc_block_ addressState_stg | median - address balance in txHash | median | |
| SCHEMA.DATASET.btc_block_ addressState_stg | median - address total spend in txHash | median | |
| SCHEMA.DATASET.btc_block_ addressState_stg | median - address total spend count in txHash | median | |
| SCHEMA.DATASET.btc_block_ addressState_stg | standard deviation - address balance in txHash | st. dev | |
| SCHEMA.DATASET.btc_block_ addressState_stg | standard deviation - address total spend in txHash | st. dev | |
| SCHEMA.DATASET.btc_block_ addressState_stg | standard deviation - address total spend count in txHash | st. dev | |
| Manual | Illicit/Licit Flag | binary flag | If any of the following flags = 1; then the illicit label = 1 ---> dark market, mixer, gambling, high risk exchange, criminal, ransomware, sanctioned |

The invention claimed is:

1. A computer implemented method of decomposing a blockchain comprising transactions in digital currency for analysis and display, the method comprising:
- determining a range of blocks in the blockchain;
- unpacking each block in the range of blocks in the blockchain into a corresponding table comprising one or more rows of input and output data for each of the transactions stored in the block; and
- for the range of blocks in the blockchain, aggregating entity information and aggregating transaction information into a block analysis table.

2. The method of claim 1, further comprising after unpacking each block, merging the tables for each block into a merged data frame.

3. The method of claim 2, wherein aggregating entity information and aggregating transaction information into the block analysis table comprises extracting aggregated entity information and aggregated transaction information for the aggregated entity information from the merged data frame using one or more scripts or functions.

4. The method of claim 1 wherein the transaction information is stored in a tree-like structure and wherein the step of unpacking each block in the range of blocks comprises for each block in the range of blocks:
- unpacking the block into a table comprising one or more rows of input and output data for each of the transactions stored in the block; and
- aggregating the one or more rows of input and output data to form an aggregated row of transaction data for each of the transactions.

5. The method of claim 4 wherein the step of unpacking the block comprises:
- unpacking the block into a plurality of stages; and
- performing outer joins between the plurality of stages to obtain a table comprising the one or more rows of input and output data for each of the transactions.

6. The method of claim 5 wherein the step of performing outer joins comprises:

using SCHEMA.DATASET.btc_block_stg table as a primary table; and performing outer joins to the stages in the plurality of stages to extract unnested information from the block into the table.

7. The method of claim 4 wherein the block is stored in NoSQL format.

8. The method of claim 4 wherein the step of aggregating the one or more rows of input and output data comprises combining the one or more rows into a single row by taking a statistical aggregation of values of each field in the respective rows of input and output data.

9. The method of claim 1 further comprising a step of labelling some or each of the transactions as fraudulent, wherein the step of labelling is based in part on whether an addressee listed in the transaction information is known to be involved in fraudulent activity.

10. The method of claim 1 wherein the digital currency is based on Unspent Transaction Output (UTxO) design.

11. The method of claim 1 further comprising analysing digital currency activity using the block analysis table.

12. The method of claim 1 further comprising displaying digital currency activity using the block analysis table.

13. A node in a computing network for decomposing a blockchain comprising transactions in digital currency for analysis and display, wherein the node is configured to:

determine a range of blocks in the blockchain;

unpack each block in the range of blocks in the blockchain into a table comprising one or more rows of input and output data for each of the transactions stored in the block; and for the range of blocks in the blockchain, aggregate entity information and aggregate transaction information into a block analysis table.

14. A non-transitory computer readable medium having computer readable code embodied therein, the computer readable code being configured such that, on execution by a suitable computer or processor, the computer or processor is caused to perform operations for decomposing a blockchain comprising transactions in digital currency for analysis and display, the operations comprising:

determining a range of blocks in the blockchain;

unpacking each block in the range of blocks in the blockchain into a table comprising one or more rows of input and output data for each of the transactions stored in the block; and for the range of blocks in the blockchain, aggregating entity information and aggregating transaction information into a block analysis table.

15. The node of claim 13, wherein:

the node is further configured to, after unpacking each block, merge the tables for each block into a merged data frame; and the aggregating of the entity information and the aggregating of the transaction information into the block analysis table comprises extracting aggregated entity information and aggregated transaction information for the aggregated entity information from the merged data frame using one or more scripts or functions.

16. The node of claim 13, wherein:

the transaction information is stored in a tree-like structure; and each block is unpacked by:

unpacking the block into a table comprising one or more rows of input and output data for each of the transactions stored in the block; and aggregating the one or more rows of input and output data to form an aggregated row of transaction data for each transaction.

17. The node of claim 16, wherein the aggregating of the one or more rows of input and output data comprises combining the one or more rows into a single row by taking a statistical aggregation of values of each field in the respective rows of input and output data.

18. The computer readable medium of claim 14, wherein:

the operations further comprise, after unpacking each block, merging the tables for each block into a merged data frame; and the aggregating of the entity information and the aggregating of the transaction information into the block analysis table comprises extracting aggregated entity information and aggregated transaction information for the aggregated entity information from the merged data frame using one or more scripts or functions.

19. The computer readable medium of claim 14, wherein:

the transaction information is stored in a tree-like structure; and each block is unpacked by:

unpacking the block into a table comprising one or more rows of input and output data for each of the transactions stored in the block; and aggregating the one or more rows of input and output data to form an aggregated row of transaction data for each of the transactions.

20. The computer readable medium of claim 19, wherein the aggregating of the one or more rows of input and output data comprises combining the one or more rows into a single row by taking a statistical aggregation of values of each field in the respective rows of input and output data.

* * * * *